US011605204B2

(12) United States Patent
Kayo et al.

(10) Patent No.: US 11,605,204 B2
(45) Date of Patent: Mar. 14, 2023

(54) IMAGE PROCESSING FOR AUGMENTED REALITY

(71) Applicant: ARM Limited, Cambridge (GB)

(72) Inventors: Sila Kayo, Oulu (FI); Roman Savelyev, Oulu (FI)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/378,699

(22) Filed: Apr. 9, 2019

(65) Prior Publication Data

US 2019/0311544 A1    Oct. 10, 2019

(30) Foreign Application Priority Data

Apr. 10, 2018 (GB) ...................................... 1805939

(51) Int. Cl.
*G06T 19/00* (2011.01)
*H04L 67/131* (2022.01)

(52) U.S. Cl.
CPC .......... *G06T 19/006* (2013.01); *H04L 67/131* (2022.05); *G06T 2219/024* (2013.01)

(58) Field of Classification Search
CPC .. G06T 19/006; G06T 2219/024; H04L 67/38
USPC ........................................................ 345/419
See application file for complete search history.

(56) References Cited

U.S. PATENT DOCUMENTS

| 2010/0287485 | A1* | 11/2010 | Bertolami | G06F 3/011 715/764 |
| 2011/0216060 | A1* | 9/2011 | Weising | G06F 3/0346 345/419 |
| 2012/0072420 | A1* | 3/2012 | Moganti | G06F 16/748 707/737 |
| 2012/0306850 | A1* | 12/2012 | Balan | G06F 3/0304 345/419 |

(Continued)

FOREIGN PATENT DOCUMENTS

| CN | 107741886 A | 2/2018 |
| WO | 2016209605 A1 | 12/2016 |

OTHER PUBLICATIONS

Combined Search and Examination Report dated Oct. 16, 2018 for GB Application No. GB1805939.4.

*Primary Examiner* — Jin Ge
(74) *Attorney, Agent, or Firm* — EIP US LLP

(57) ABSTRACT

Examples of the present disclosure relate to a computing device for processing images captured in three-dimensional environments, for the generation of augmented reality scenes. The computing device is configured to obtain an augmented reality anchor, the anchor corresponding to a position and orientation in a real-world environment. The computing device is configured to receive image capture data via data communication from a remote user device. The image capture data comprises an image captured by the user device, the image representing the real-world environment as viewed by the user device. The computing device is configured to process the image capture data to determine (Continued)

spatial data which maps the anchor to the image. The spatial data is usable by the remote user device to insert a virtual object into the image, in accordance with the anchor, to generate an augmented reality scene at the remote user device. The computing device is configured to transmit the determined spatial data via data communication to the remote user device.

18 Claims, 8 Drawing Sheets

(56) References Cited

U.S. PATENT DOCUMENTS

| | | | | |
|---|---|---|---|---|
| 2013/0282345 | A1* | 10/2013 | McCulloch | G06T 19/006 703/6 |
| 2014/0306993 | A1* | 10/2014 | Poulos | G06T 19/006 345/633 |
| 2015/0123966 | A1* | 5/2015 | Newman | G06T 19/006 345/419 |
| 2016/0133230 | A1* | 5/2016 | Daniels | G06T 19/006 345/633 |
| 2016/0379409 | A1* | 12/2016 | Gavriliuc | G06T 19/006 345/8 |
| 2017/0256097 | A1* | 9/2017 | Finn | G06T 19/006 |
| 2018/0033208 | A1* | 2/2018 | Martin | H04N 1/00244 |
| 2018/0124409 | A1* | 5/2018 | Chen | H04N 19/43 |
| 2018/0321894 | A1* | 11/2018 | Paulovich | G06F 3/1454 |
| 2019/0114802 | A1* | 4/2019 | Lazarow | G06T 7/74 |
| 2019/0114902 | A1* | 4/2019 | Lazarski | G08B 25/016 |
| 2019/0304406 | A1* | 10/2019 | Griswold | G06F 3/012 |

* cited by examiner

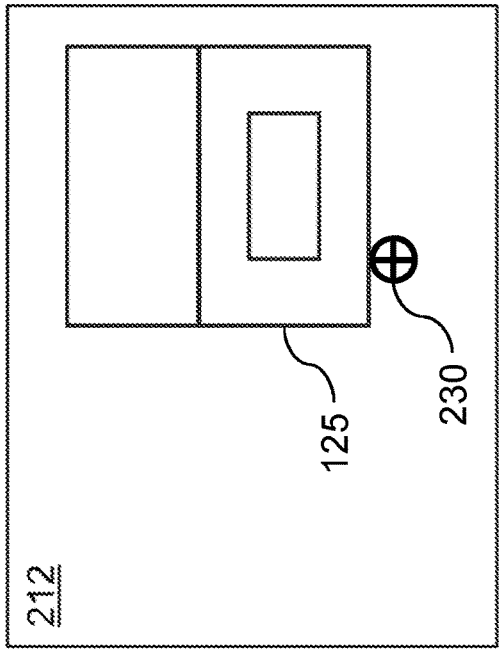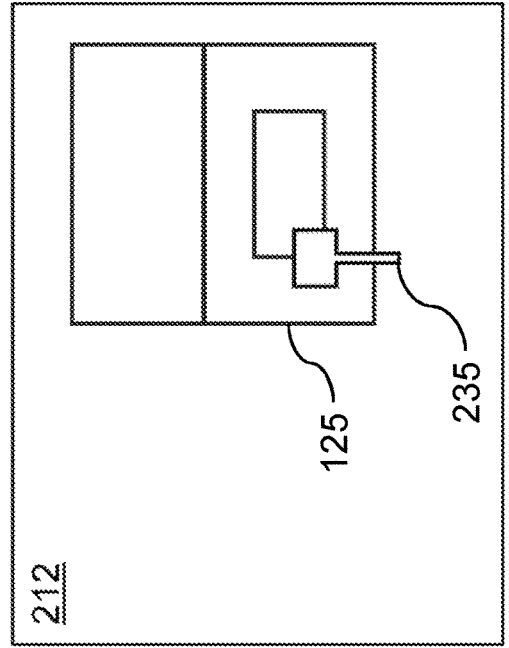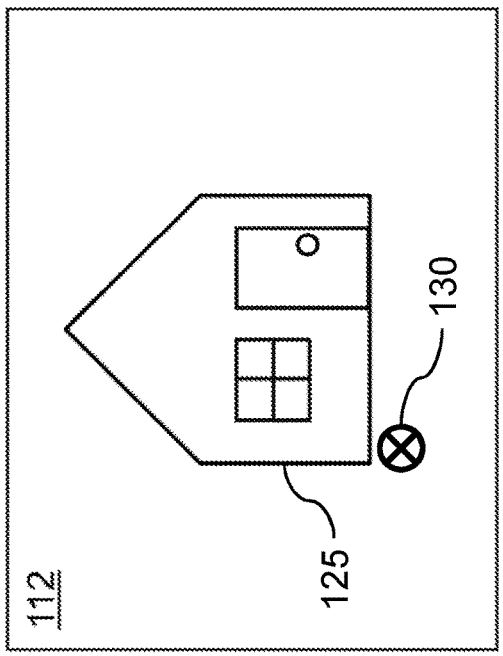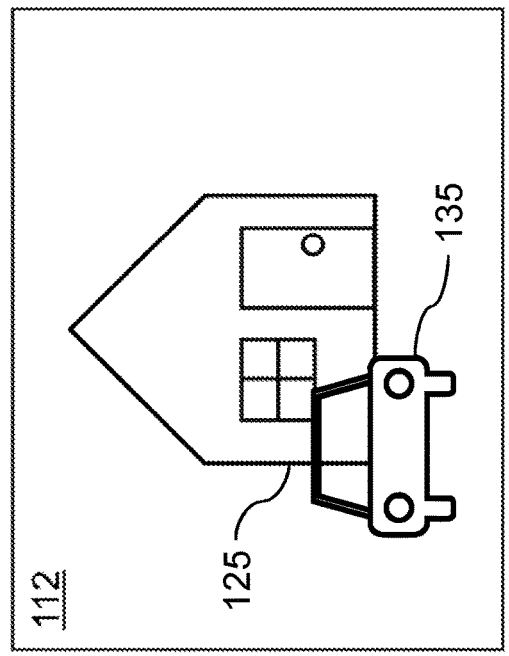

IMAGE PROCESSING FOR AUGMENTED REALITY

CROSS-REFERENCE TO RELATED APPLICATIONS

This application claims the benefit under 35 U.S.C. § 119(a) and 37 CFR § 1.55 to United Kingdom patent application no. GB1805939.4, filed on Apr. 10, 2018, the entire content of which is incorporated herein by reference.

BACKGROUND OF THE INVENTION

Field of the Invention

The present disclosure relates to image processing, particularly in relation to augmented reality and/or virtual reality environments.

Description of the Related Technology

Processing image data in relation to augmented reality (AR) or virtual reality (VR) environments involves determining where to position (or 'anchor') virtual objects. In an AR environment, this can involve determining locations of where to render one or more virtual objects in relation to one or more real objects in the physical environment. In a VR environment, this can involve determining locations of where to render one or more virtual objects in relation to one or other virtual objects in the simulated environment.

A challenge is to determine where to position virtual objects in images captured by multiple user devices sharing an AR or VR experience, with an accuracy and/or frequency sufficient for various applications, whilst conserving computing resources.

This challenge is increased for AR and VR applications, due to the considerable demands of AR and VR environment generation and image rendering. It is a particular challenge for AR and VR applications which execute on mobile computing devices, such as general-purpose smartphones and general-purpose tablet computing devices, which have relatively small amounts of available computing resources.

SUMMARY

In a first embodiment, there is provided a computing device for processing images captured in three-dimensional environments for the generation of augmented reality scenes, the computing device being configured to:

obtain an augmented reality anchor, the anchor corresponding to a position and orientation in a real-world environment;

receive image capture data via data communication from a remote user device, the image capture data comprising an image captured by the remote user device, the image representing the real-world environment, as viewed by the remote user device;

process the image capture data to determine spatial data which maps the anchor to the image, the spatial data being usable by the remote user device to insert a virtual object into the image in accordance with the anchor to generate an augmented reality scene at the remote user device; and transmit the determined spatial data via data communication to the remote user device.

In a second embodiment, there is provided a computer-implemented method in a computing device for processing images captured in three-dimensional environments, for the generation of augmented reality scenes, the method comprising:

obtaining an augmented reality anchor, the anchor corresponding to a position and orientation in a real-world environment;

receiving image capture data via data communication from a remote user device, the image capture data comprising an image captured by the remote user device, the image representing the real-world environment, as viewed by the remote user device;

processing the image capture data to determine spatial data which maps the anchor to the image, the spatial data being usable by the remote user device to insert a virtual object into the image in accordance with the anchor to generate an augmented reality scene at the remote user device; and transmitting the determined spatial data via data communication to the remote user device.

In a third embodiment, there is provided a non-transitory computer-readable storage medium comprising a set of computer-readable instructions stored thereon which, when executed by at least one processor, cause the at least one processor to:

obtain an augmented reality anchor, the anchor corresponding to a position and orientation in a real-world environment;

receive image capture data via data communication from a remote user device, the image capture data comprising an image captured by the remote user device, the image representing the real-world environment, as viewed by the remote user device;

process the image capture data to determine spatial data which maps the anchor to the image, the spatial data being usable by the remote user device to insert a virtual object into the image in accordance with the anchor to generate an augmented reality scene at the remote user device; and transmit the determined spatial data via data communication to the remote user device.

Further features and advantages will become apparent from the following description of examples which is made with reference to the accompanying drawings.

BRIEF DESCRIPTION OF THE DRAWINGS

FIGS. 4A and 4B, 5A and 5B, 6A and 6B, and 7A and 7B show schematic representations of the captured images of FIGS. 3A and 3B as processed according to examples.

DETAILED DESCRIPTION OF CERTAIN INVENTIVE EMBODIMENTS

Details of the apparatuses and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1A:
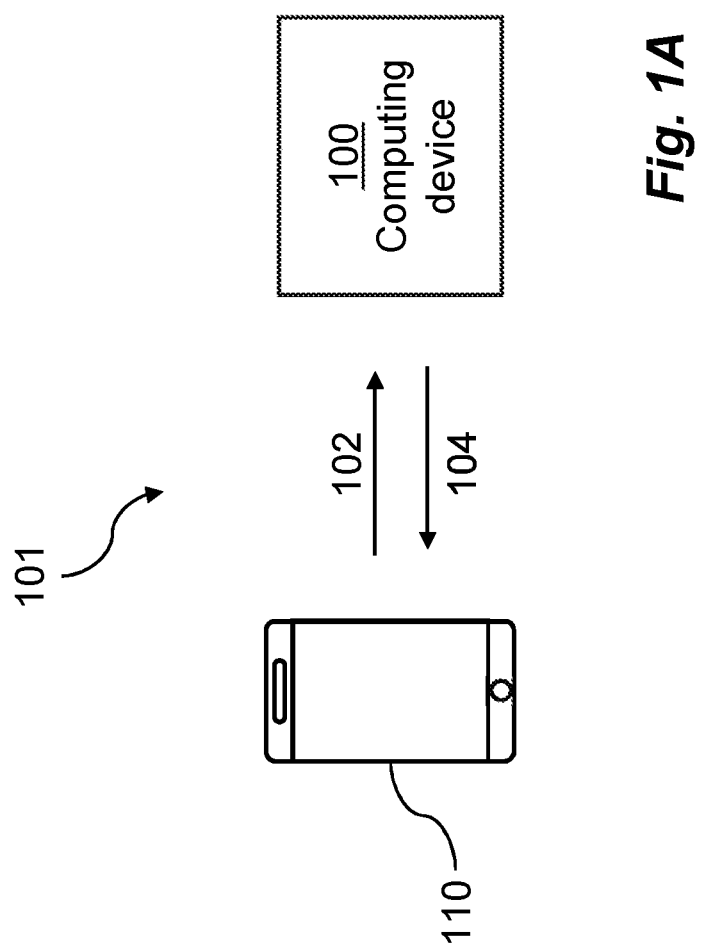
FIGS. 1A to 1C show schematic representations of an AR system comprising a computing device, according to examples.

Referring to FIG. 1A, examples described herein provide a computing device 100. The computing device 100 may include data storage comprising computer executable instructions and one or more processors, for example a central processing unit (CPU), a graphics processing unit (GPU) and/or other processors, which may be combined as a System on a Chip (SoC) or onto multiple SoCs to form one or more application processors.

In examples, an augmented reality (AR) engine is provided on the computing device 100. The AR engine may be in the form of one or more software and/or hardware modules. The AR engine may, for example (e.g.), be part of an AR platform or operating system, such as Apple ARKit™, Google ARCore™ or Google Tango™, installed on the computing device 100.

The computing device 100 may, e.g. via the AR engine, function as part of an AR system comprising multiple remote user devices 110. The multiple remote user devices 110 may experience, via the AR system 101, an augmented reality shared between them.

One or more of the remote user devices 110 may be in the form of a general-purpose smartphone or general-purpose tablet computing device, such as an Android™ or Apple iOS™ device, as shown in FIG. 1A. In examples, one or more of the remote user devices 110 may be removably mounted to a corresponding separate headset (not shown). In examples, one or more of the remote user devices 110 may be in the form of an AR headset, or AR glasses, which can be worn by a user (not shown).

The remote user devices 110 may be provided with one or more image sensors. The remote user devices 110 may thus capture images of a real-world environment using the respective image sensors. The images may depict a field-of-view of the real-world environment that is capturable by each respective remote user device 110. The images may be augmented by the AR engine to include virtual objects and features when displayed, e.g. on the respective remote user devices 110.

A visual odometry system may be provided on the computing device 100, in the form of one or more software and/or hardware modules. The visual odometry system may conduct visual odometry using at least image data received from an image sensor provided on a remote user device. The visual odometry may be performed at least in part by processing the image data received from the image sensor on the remote user device 110.

The visual odometry system may be implemented as any one of a variety of known visual odometry algorithms, and may for example be provided by the AR platform installed on the computing device 100.

The computing device 100 may be assigned an AR anchor. For example, the anchor may be allocated, or may "belong", to the computing device 100, which may be the "owner" of the anchor. The anchor corresponds to a position and orientation in a real-world environment. For example, the anchor may define a real-world position and orientation.

The anchor may describe a fixed location and orientation in the real world. The real-world position and orientation (or "pose") of the anchor may be stored as an attribute of the anchor in the AR system 101, e.g. on the computing device 100.

In examples, the assignment (or "allocation") of the anchor to the computing device 100 is implemented by assignment data, e.g. a record, stored on the AR system, the assignment data associating the anchor with the computing device 100. For example, the assignment data may associate or "link" an identifier of the anchor with an identifier of the computing device 100. The identifiers of the anchor and the computing device 100 may allow the respective entity to be identified and, in certain examples, instructed. An identifier may comprise a tag or a label for an entity of the AR system 101, for example. In examples, the computing device 100 is configured to assign the anchor. For example, the computing device 100 may be configured to generate the assignment data.

The assignment data may be stored in a data structure, e.g. a lookup table. For example, the data structure may comprise, e.g. store, an entry having the identifier of the computing device 100 as a first element thereof, and the identifier of the anchor as a second element thereof. The entry may thus link the anchor to the computing device 100, thus assigning or allocating the anchor thereto. The data structure comprising the assignment data may be stored on a server of the AR system 101, for example. In other examples, the data structure comprising the assignment data is stored on each remote user device 110 of the AR system 101. In certain cases, a server stores a master copy of the data structure comprising the assignment data, and the remote user devices 110 store respective copies of the data structure. For example, an update to the assignment of the anchor, e.g. to another computing device of the AR system 101, may be implemented in a corresponding update to the assignment data stored in the master copy of the data structure at the server. The update to the assignment data may then be broadcast to the remote user devices 110 via data communication. For example, respective copies of the updated master copy of the data structure may be sent from the server to the respective remote user devices 110 via data communication. Alternatively, information relating to the updated entry may be communicated to the remote user devices 110 for the respective copies of the data structure stored at the remote user devices 110 to be updated to correspond to the updated master copy at the server.

The computing device 100 is configured to obtain the anchor, e.g. for use in processing image data. In examples, computing device 100 may be configured to store the anchor, e.g. in storage such as a random-access memory (RAM), a read-only memory (ROM), an erasable programmable read-only memory, and/or cache storage. For example, the computing device 100 may store data representing the anchor in storage. The storage may be comprised on the computing device 100. In other examples, the anchor data is stored in storage elsewhere in the AR system 101, e.g. on a server or other remotely accessible device. The computing device 100 may thus obtain the data representing the anchor by accessing the storage which stores the anchor data.

In examples, the assignment data representing the assignment of the anchor to the computing device 100 may be stored as an attribute of the anchor, e.g. along with the attribute of the anchor defining its pose. For example, the identifier of the computing device 100 may be stored as part of the data representing the anchor. Thus, in examples, the computing device 100 is configured to obtain each anchor having the identifier of the computing device 100 as an attribute.

Additionally or alternatively, the computing device 100 may store the assignment data. For example, the computing device 100 may store the identifier of each anchor assigned to the computing device 100. The computing device 100 may thus be configured to obtain each anchor corresponding to an identifier stored as part of the assignment data on the computing device 100. In certain cases, the computing device 100 may store the identifier of each anchor present in the AR system 101 and a corresponding flag variable. A first value of the flag variable for a given anchor may represent the given anchor being assigned to the computing device 100. A second value of the flag variable may represent the given anchor not being assigned to the computing device 100. Thus, the computing device 100 may be configured to obtain each anchor for which the corresponding flag variable has the first value. In examples, the computing device 100 may transmit a data message to other entities of the AR system 101, notifying those entities of the anchor(s) assigned to the computing device 100. For example, the data message may contain the identifiers of the anchor(s) and the computing device 100.

An anchor may be created in the AR system 101, e.g. using a createAnchor(pose) method, with the pose corresponding to the created anchor given as a parameter. In examples, the anchor may be created at a hit location, e.g. a pose of an intersection between a ray and detected real-world geometry. Upon creation of the anchor, a data message may be broadcast to the other entities of the AR system 101 notifying them of the existence of the created anchor. The data message may contain the identifier of the anchor. In examples, the data message contains the identifier of the computing device to which it is assigned, as described above. For example, the anchor may be created at the computing device to which it is to be assigned. The computing device may thus broadcast the existence of the anchor, and in some examples the assignment of the anchor to the computing device, to the other entities of the AR system 101 via data communication, in response to creating the anchor.

In examples, the anchor may be attached to a Trackable, e.g. a real-world object or feature, which can be tracked by the AR system 101. The pose of the anchor may thus correspond to an offset relative to the Trackable.

The anchor, having a corresponding pose in the real-world, can be mapped to images captured by remote user devices 110 of the AR system 101. Thus, the anchor can be tracked by the AR system 101 in a series of images captured a given remote user device 110, for example.

Figure 1C:
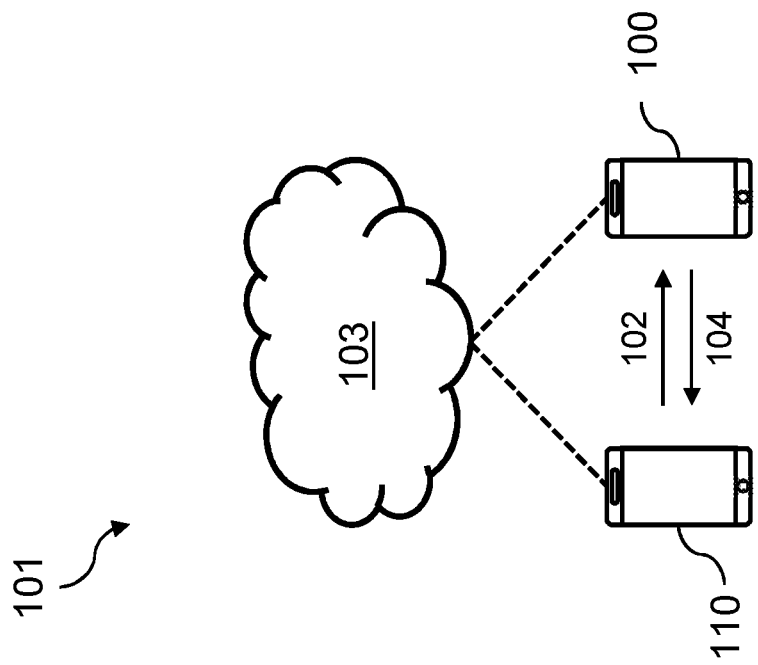
Figure 1B:
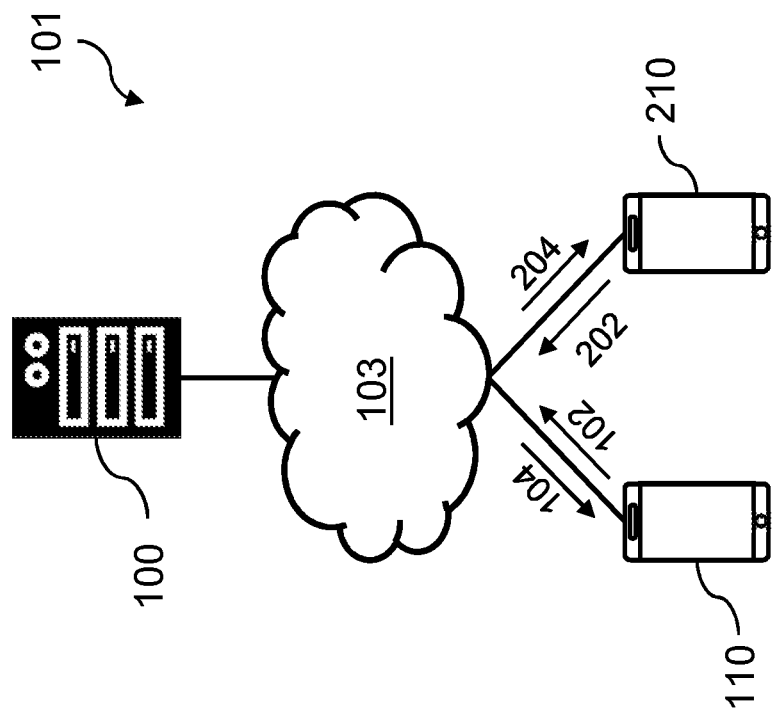

FIG. 1B shows an example AR system 101 wherein the computing device 100 is implemented as a server device communicatively coupled to the remote user device 110 via a communications network 103. In examples, the remote user device 110 is one of a plurality of remote user devices 110, 210 communicatively coupled to the server device 100 via the communications network 103.

FIG. 1C shows an example AR system 101 wherein the computing device 100 is implemented as another remote user device communicatively coupled to the remote user device 110. The remote user devices 100, 110 may communicate directly, or via a communications network 103, as shown.

Figure 2:
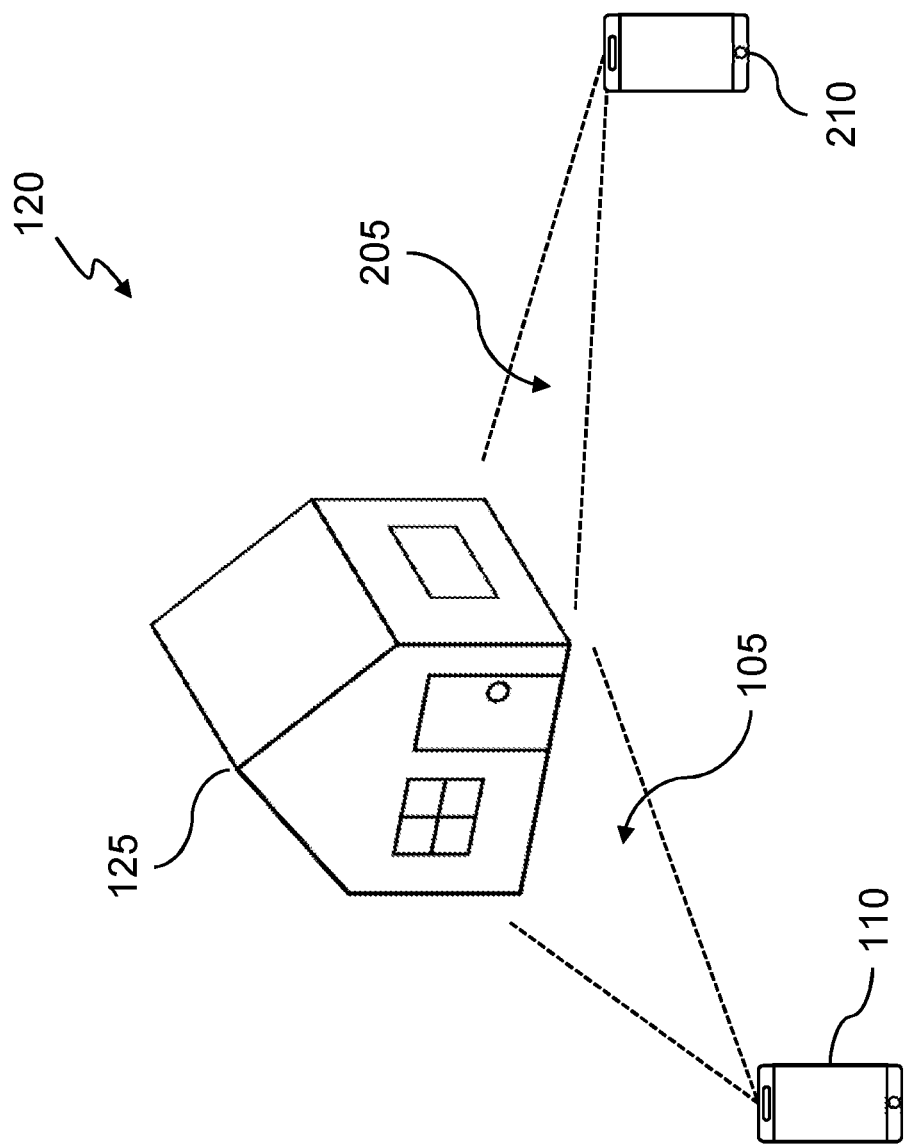
FIG. 2 shows a schematic representation of two remote user devices viewing a real-world environment from different perspectives, according to an example.
Figure 3B:
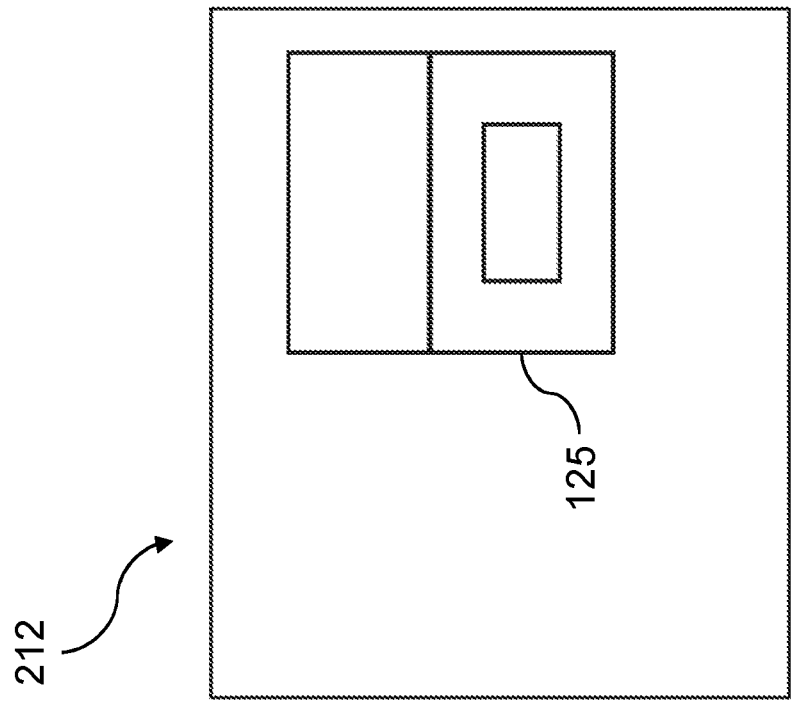
FIGS. 3A and 3B show schematic representations of respective images captured by the two user devices of FIG. 2.
Figure 3A:
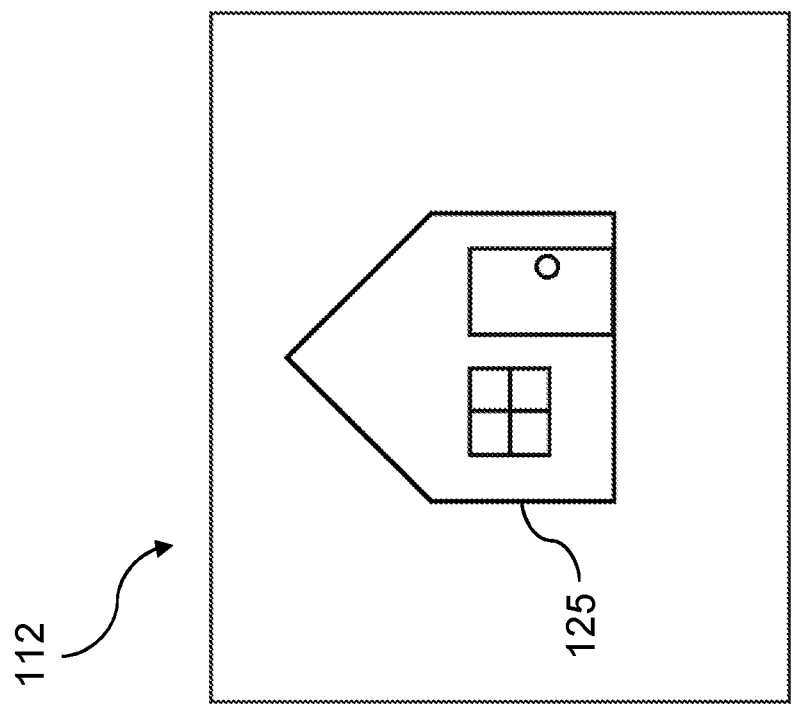

Referring to FIGS. 1A, 2 and 3A, the computing device 100 is configured to receive image capture data 102 via data communication from a remote user device 110, e.g. as part of an AR system 101. The image capture data 102 comprises an image, captured by the remote user device 110, representing an environment 120 as viewed by the remote user device 110. The environment 120 may be a real-world environment, e.g. comprising the house 125 shown in FIG. 2. The image 112 captured by the remote user device 110 may represent a field of view 105 of the remote user device 110, e.g. an extent of the observable environment 120 that is capturable by the remote user device 110.

The remote user device 110 may comprise an image sensor, such that the remote user device 110 may view the real-world environment 120, and capture the image 112 thereof, via the image sensor. Thus, the field of view 105 of the remote user device 110 may be that of the image sensor. The image 112 may be captured by the image sensor of the remote user device 110 and represented as image capture 112 data. For example, the image 112 may be generated and/or displayed (e.g. on an electronic display) based on the image data. The image 112 may thus be received by the computing device 100 in the form of the image data representing the image 112. FIG. 3A shows the image 112 captured by the remote user device 110 and received by the computing device 100, as described.

The environment 120, as viewed by the remote user device 110 and captured thereby in the image 112, comprises the real-world position corresponding to the anchor. For example, the anchor may have been generated, e.g. via the AR engine, to have its corresponding real-world position. The real-world position of the anchor may have been specified by a user of the AR system, e.g. directly by entering real-world position data or indirectly via specifying a position in an image captured by an AR user device from which the real-world position may be derived. In examples, the real-world position of the anchor may correspond to a location representable in a world- or geographical coordinate system. The environment 120 may thus correspond to a region in the world- or geographical coordinate system, the said region containing the said location corresponding to the anchor.

In examples, the anchor may be generated based on, e.g. relative to, another image, different to the image 112 referenced above. The other image may be captured by a remote user device, e.g. the remote user device 110, of the AR system. For example, a user may generate the anchor based on a location in the captured image, e.g. by gesturing or otherwise specifying the location in the image. The image may be captured by the remote user device on which the user generates the anchor, for example. The computing device 100 or a remote user device, e.g. the remote user device that captured the image, may process the image capture data comprising the captured image to determine the real-world pose of the anchor generated based on the captured image. For example, the computing device 100 or remote user device may use pose estimation to determine the real-world pose of the anchor 130 based on the image capture data. For example, a 3D pose estimation may be used to extract 3D data attributes of the anchor from the 2D captured image. The computing device 100 may be configured to map the 3D data, e.g. the real-world pose of the anchor 130, to other 2D images captured by other remote user devices. For example, the determined spatial data may include mapping data associated with mapping the 3D attribute data of the anchor to a given image captured by a given remote user device.

The computing device 100 is configured to process the image 112 to determine spatial data 104 which maps the anchor to the image 112. The determined spatial data 104 is usable by the remote user device 110 to insert a virtual object into the image 112, in accordance with the anchor, to generate an augmented reality scene at the remote user device 110. For example, the remote user device 110 may be able to overlay the virtual object in the image 112, in accordance with the anchor, based on the determined spatial data 104. The determined spatial data 104 may comprise at least one of position, orientation and scale data corresponding to the anchor arranged in the image 112. The spatial data 104 may be relative to the image 112. For example, the determined spatial data 104 may include position and orientation, e.g. pose, data which defines a pose of the anchor in the image 112. The computing device may be configured to process the image capture data 102 to determine the spatial data 104 using pose estimation. For example, the computing device 100 may perform a 3D pose estimation to determine 3D spatial data, e.g. 3D rotation and/or translation data, of the anchor in the 2D image 112. In examples, the remote user device 110 may be calibrated to a world coordinate system such that the computing device 100 may determine the 3D spatial data of the anchor in the 2D image 112.

The spatial data 104 may include position data in the form of Cartesian (x, y) coordinates relative to the coordinate space of the image 112, such that the anchor can be placed at the location in the image defined by those coordinates. Similarly, the spatial data 104 may additionally or alternatively include orientation information, e.g. of an angle or rotation, relative to the coordinate space of the image 112, such that the anchor can be orientated in the image in the way defined by the orientation information, e.g. at the said angle or rotation. The spatial data 104 may additionally or alternatively include scale data, e.g. defining a scale for the anchor relative to the image 112. FIG. 4A shows the anchor 130, e.g. assigned to the computing device 100, mapped to the image 112 based on the spatial data 104 determined by the computing device 100.

The computing device 100 is configured to transmit the determined spatial data 104 via data communication to the remote user device 110. The remote user device 110 may be able to, after receiving the spatial data 104, use the spatial data 104 to insert a virtual object into the image 112, in accordance with the anchor to, generate an augmented reality scene. For example, the virtual object may be an AR object retrievable from an object library of stored virtual objects as part of the AR platform. At least part of the object library may be stored in memory on the remote user device 110, for example. The virtual object may be represented in the form of corresponding virtual object data. Thus, the remote user device 110 may insert, e.g. overlay, the virtual object in the image 112 based on the received spatial data 104 corresponding to the anchor, e.g. assigned to the computing device 100, and based on the virtual object data corresponding to the virtual object. For example, the remote user device 110 may apply the spatial data 104 to the virtual object data, or vice versa, in order to insert the virtual object at the determined position and/or orientation and/or scale of the anchor as mapped to the image 112.

FIG. 5A shows a virtual object 135, depicting a car, inserted into the image 112 based on the spatial data 104 mapping the anchor 130 to the image. For example, the virtual car object 135 may be positioned (e.g. relative to the house 125 as shown in FIG. 5A) and/or orientated (e.g. facing towards the viewer as shown in FIG. 5A) and/or scaled (e.g. relative to the house 125 as shown in FIG. 5A) in the image 112 based on the spatial data 104 determined by the computing device 100.

Figure 6A:
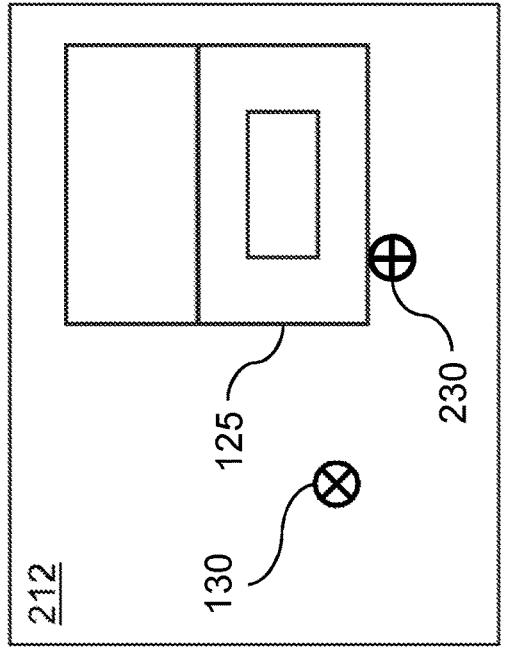

In some examples, the computing device is configured to obtain a plurality of augmented reality anchors. Each anchor may correspond to a respective pose in the real-world environment. Each of the plurality of anchors may be assigned to the computing device 100. The computing device may thus be configured to process the image capture data 102 to determine respective spatial data 104 which maps each of the plurality of anchors to the image. For example, the anchor 130 described above may be a first anchor 130, and a second anchor 230 may also be obtained by the computing device 100. FIG. 6A shows the first and second anchors 130, 230, e.g. assigned to the computing device 100, mapped to the image 112, captured by the remote user device 110 and received by the computing device 100, based on respective spatial data 104 determined by the computing device 100.

The computing device 100 may be configured to transmit the determined respective spatial data 104 via data communication to the remote user device 110. The respective spatial data 104 may be usable by the remote user device 110 to insert respective virtual objects into the image 112.

For example, the respective virtual objects may be different AR objects retrievable from the object library, as part of the AR platform, as described above. Each virtual object may be represented in the form of corresponding virtual object data. Thus, the remote user device 110 may insert each virtual object into the image 112 based on the respective received spatial data 104, corresponding to the respective anchors 130, 230, e.g. assigned to the computing device 100, and based on the virtual object data corresponding to the virtual object.

Figure 7A:
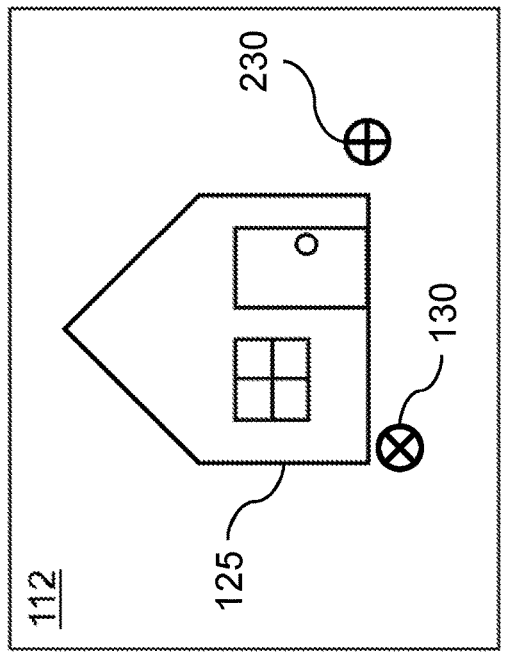

FIG. 7A shows a first virtual object 135, depicting a car, inserted into the image 112 based on the spatial data 104 mapping the first anchor 130 to the image 112, as described above with reference to FIG. 5A. FIG. 7A also shows a second virtual object 235, depicting a mailbox, inserted into the image 112 based on the respective spatial data 104 mapping the second anchor 230 to the image 112.

The virtual car and mailbox objects 135, 235 may be positioned (e.g. relative to the house 125 as shown in FIG. 7A) and/or orientated (e.g. facing towards the viewer as shown in FIG. 7A) and/or scaled (e.g. relative to the house 125 as shown in FIG. 7A) in the image 112 based on the respective spatial data 104 determined by the computing device 100 for each of the anchors 130, 230.

In examples, the respective virtual objects may be different instances of the same AR object. For example, different versions of the same virtual object, represented by the same virtual object data, may be inserted into the image by applying the respective spatial data 104, corresponding to the different anchors 130, 230, to different instances, or "copies", of the virtual object data.

In some examples, the computing device 100 is configured to receive respective image capture data via data communication from a plurality of remote user devices including the remote user device 110. For example, the computing device 100 may be part of an AR system including multiple remote user devices that are configured to share an augmented reality. The multiple remote user devices may thus send their captured images to the computing device 100.

Returning to FIG. 2, there is shown a first remote user device 110 with a first field-of-view 105 of the real-world environment 120, as previously described. Also shown in FIG. 2 is a second remote user device 210 having a second field-of-view 205 of the environment 120. The computing device 100 may thus be configured to receive first image capture data 102 via data communication from the first remote user device 110. The first image capture data 102 comprises a first image 112 captured by the first remote user device 110, the first image 112 representing the real-world environment 120, as viewed by the first remote user device 110, and as described previously with reference to FIG. 3A. The computing device 100 may also be configured to receive second image capture data 202 via data communication from the second remote user device 210. The second image capture data 202 comprises a second image 212 captured by the second remote user device 210, the second image 212 representing the real-world environment 120 as viewed by the second remote user device 210.

The real-world environment 120, as viewed by each of the remote user devices 110, 210 and captured thereby in the respective images 112, 212, may comprise the real-world position of at least one of the first and second anchors 130, 230. For example, the anchor 130, 230 may have been generated, e.g. via the AR engine, to have its defined real-world position coincident within the real-world environment 120 viewed by at least one of the remote user devices 110, 210. The defined real-world position may have been specified by a user of the AR system, e.g. directly by entering real-world position data, or indirectly via specifying a position in a field of view captured by an AR user device—from which the real-world position may be derived. In examples, the real-world position of the anchor, e.g. assigned to the computing device 100, may correspond to a location representable in a world- or geographical coordinate system. The environment 120 may thus correspond to a region in the world- or geographical coordinate system, the region containing the said location defined by the anchor.

The computing device 100 may be configured to process the received respective image capture data 102, 202, comprising the respective images 112, 212. For a given image in the plurality of images 112, 212 the computing device 100 may determine respective spatial data 104, 204 which maps each anchor 130, e.g. assigned to the computing device 100, to the given image 112, 212.

Figure 6B:
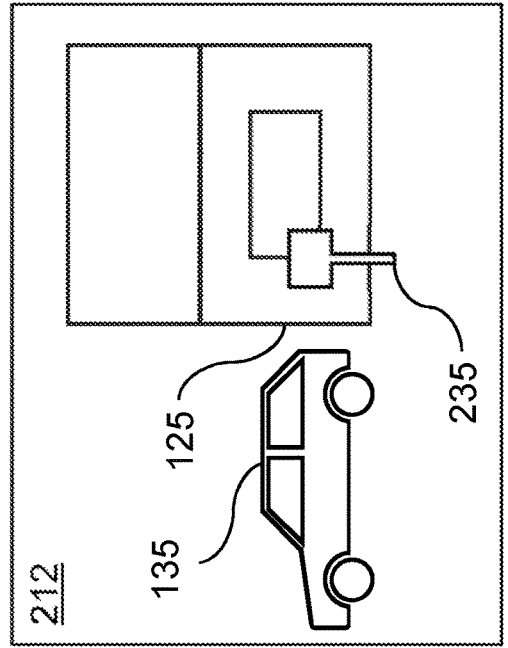

For example, FIG. 6A shows the anchor 130, e.g. assigned to the computing device 100, mapped to the first image 112 based on the respective spatial data 104 determined by the computing device 100 for the first image 112. FIG. 6B shows the same anchor 130 mapped to the second image 212 based on the spatial data 204 determined by the computing device 100 for that image 212.

The computing device 100 may transmit the respective determined spatial data 104, 204 to the respective remote user devices 110, 210. For example, the respective spatial data 104 mapping the anchor 130, e.g. assigned to the computing device 100, to the first image 112 may be transmitted, by the computing device 100, to the first remote user device 110. Similarly, the respective spatial data 204 mapping the anchor 130, e.g. assigned to the computing device 100, to the second image 212 may be transmitted, by the computing device 100, to the second remote user device 210.

The respective spatial data 104, 204 determined for each anchor 130 may be usable by the corresponding remote user device 110, 210 to insert, e.g. overlay, a virtual object into the corresponding image 112, 212 in accordance with each anchor 130 mapped thereto.

Figure 7B:
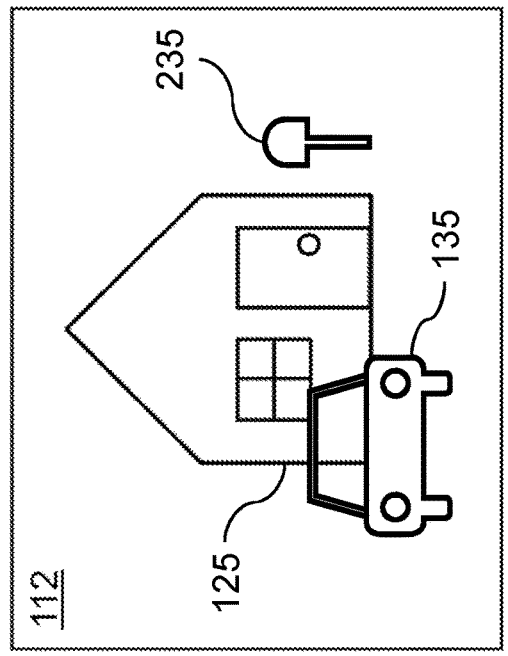

For example, FIG. 7A shows the virtual car object 135 inserted into the first image 112 based on the respective spatial data 104, determined by the computing device 100, which maps the anchor 130 to the first image 112 (as similarly described with reference to FIG. 5A previously). FIG. 7B shows the virtual car object 135 inserted into the second image 212 based on the respective spatial data 204, determined by the computing device 100, which maps the anchor 130 to the second image 212.

In this example, the virtual car object 135 is positioned and orientated differently in each of the respective images 112, 212, shown in FIGS. 7A and 7B, based on the respective spatial data 104, 204 determined by the computing device 100 for the anchor 130 in each of the images 112, 212. For example, the positioning of the virtual car object 135 relative to the house 125 in each image 112, 212 is different, as is the orientation of the virtual car object 135 in each image 112, 212 (e.g. facing towards the viewer in the first image 112, FIG. 7A; facing to the left in the second image 212, FIG. 7B). In examples, scaling of the virtual car object 135 in each of the respective images 112, 212 may also vary, additionally or alternatively, based on the respective spatial data 104, 204 determined by the computing device 100 for the anchor 130 in each of the images 112, 212. For example, the computing device 100 may determine the relative distance of the viewer from the defined real-world position of the anchor 130 in each of the images 112, 212 (or relatively between the images 112, 212). The respective spatial data 104, 204 determined for the anchor 130 in each of the images 112, 212 may therefore comprise respective scaling data for the anchor, the respective scaling data accounting for the determined relative distance of the viewer from the defined real-world position of the anchor 130 in each of the images 112, 212.

In examples, the computing device 100 is configured to receive respective image capture data 102, 202 from a plurality of remote user devices 110, 210, the respective image capture data 102, 202 comprising respective images 112, 212 captured by the plurality of remote user devices 110, 210, while also being configured to obtain a plurality of anchors 130, 230. Each anchor 130, 230 may be assigned to the computing device 100, as described previously. Each anchor 130, 230 may correspond to a respective real-world pose.

The computing device may thus be configured to process the respective image capture data 102, 202 to determine respective spatial data 104, 204 that maps each anchor 130, 230 to the respective image 112, 212.

For example, FIG. 6A shows two anchors 130, 230, e.g. each assigned to the computing device 100, mapped to the first image 112 based on the respective spatial data 104 determined by the computing device 100 for the first image 112. FIG. 6B shows the same two anchors 130, 230 mapped to the second image 212 based on the spatial data 204 determined by the computing device 100 for that image 212.

As described above, the computing device 100 may transmit the respective spatial data 104, 204 via data communication to the corresponding remote user devices 110, 210. The respective spatial data 104, 204, determined for each anchor 130, 230, may be usable by the corresponding remote user device 110, 210 to insert a virtual object 135, 235 into the corresponding image 112, 212 in accordance with each anchor 130, 230 mapped thereto, to generate an augmented reality scene at the respective remote user device 110, 210.

For example, FIG. 7A shows the virtual car object 135 and the virtual mailbox object 235 inserted into the first image 112 based on the respective spatial data 104, determined by the computing device 100, which maps the anchors 130, 230 to the first image 112. Similarly, FIG. 7B shows the virtual car object 135 and the virtual mailbox object 235 inserted into the second image 212 based on the respective spatial data 204, determined by the computing device 100, which maps the anchors 130, 230 to the second image 212.

In examples, as previously described, the computing device 100 comprises a server device communicatively coupled to a plurality of remote user devices, e.g. as part of the AR system 101. The plurality of remote user devices may include the first and second remote user devices 110, 210 as described in examples above. As shown in FIG. 1B, the server device 100a may be communicatively coupled to the plurality of remote user devices 110, 210 by a communications network 103.

Thus, the server device 100 may receive respective image capture data 102, 202 from the plurality of remote user devices 110, 210 via the communications network 103. Similarly, the server device 100 may transmit the respective determined spatial data 104, 204 to the corresponding remote user devices 110, 210 via the communications network 103. The respective spatial data 104, 204, may be determined for each anchor 130, 230 as described in examples.

In examples, each remote user device 110, 210 may capture image data as a series of images, e.g. frame-by-frame. For example, each remote user device 110, 210 may continuously capture images at a given rate. In some examples, each captured image may be transmitted, in the form of image capture data, to the server device 100 for processing. In other examples, each subsequent captured image may be transmitted to the server device 100 only if a location of the remote user device 110, 210 has changed by more than a predetermined threshold compared to the location of the remote user device 110, 210 when the preceding image was captured by the remote user device 110, 210. Otherwise, the preceding image sent to the server device 100, in the form of image capture data, may be processed by the server device 100 in place of the subsequent image. This may allow less image data to be transmitted between the devices of the AR system 101, thus reducing bandwidth requirements of the AR system 101.

Referring now to FIGS. 1A and 1C, in other examples, as previously described, the computing device 100 comprises a remote user device, e.g. as part of the AR system 101. For example, as shown in FIG. 1C, the computing device 100 may be a second remote user device configured to receive the image 112 captured by a first remote user device 110. The remote user devices 110, 100 may communicate with one another directly and/or via a communications network 103.

In such examples, the image 112 captured by the first remote user device 110 may be a first image 112, and the computing device 100, implemented as a remote user device, may be configured to capture a second image 212. For example, referring to FIG. 2, the computing device 100 may comprise the second remote user device 210. FIGS. 3A and 3B show the example first and second images 112, 212 captured by the respective remote user devices 110, 210, as previously described.

In this example, the computing device 100, comprising the second remote user device 210, is configured to obtain an anchor 230, corresponding to a pose in the real-world environment. The anchor 230 may be assigned to the second remote user device 210. FIG. 4B shows the second image 212, captured by the second remote user device 210, with the anchor 230 mapped to the second image 212. As described, the anchor 230 may be generated relative to the second image 212, e.g. by a user of the AR system 101. The second remote user device 210 may use the anchor 230 to insert a virtual object, e.g. the virtual mailbox object 235, into the second image 212, in accordance with the anchor, to generate an augmented reality scene at the second remote user device 210, as shown in FIG. 5B.

As previously described, the computing device 100, comprising the second remote user device 210, is configured to receive first image capture data 102, comprising the first image 112 captured by the first remote user device 110. The second remote user device 210 is configured to process the first image capture data 102 to determine spatial data 104 which maps the anchor 230 to the first image 112. The second remote user device 210 is further configured to transmit the determined spatial data 104 to the first remote user device 110, as shown in FIG. 1C. The determined spatial data 104 is usable by the first remote user device 110 to insert a virtual object into the first image 112, in accordance with the anchor 230, to generate an augmented reality scene at the respective remote user device. For example, FIG. 6A shows the anchor 230, e.g. assigned to the second remote user device 210, mapped to the first image 112 based on the spatial data 104 determined by the second remote user device 210. FIG. 7A shows the same virtual mailbox object 235 inserted into the image 112 based on the spatial data 104, which maps the anchor 230 to the image 112, as determined by the second remote user device 210.

In this example, the first remote user device 110 may be configured to obtain a first anchor 130, e.g. an anchor that is assigned to the first remote user device 110. For example, FIG. 4A shows the first anchor 130, e.g. assigned to the first remote user device 110, mapped to the first image 112 captured by the first remote user device 110. A second anchor 230 may be assigned to the second remote user device 210. The first remote user device 110 may use the first anchor 130 to insert a virtual object, e.g. the virtual car object 135, into the first image 112, in accordance with the first anchor 130, to generate an augmented reality scene at the first remote user device 110, as shown in FIG. 5A.

The second remote user device 210 may be configured to receive further spatial data from the first remote user device 110. The further spatial data may be associated with the first anchor 130, e.g. assigned to the first remote user device 110. For example, the further spatial data may map the first anchor 130 to the second image 212, captured by the second remote user device 210. The further spatial data may comprise at least one of position, orientation and scale data corresponding to the first anchor 130 arranged in the second image 212. The spatial data may be defined relative to the image 212. For example, the determined spatial data may include pose data which defines a pose of the first anchor 130 in the second image 212.

The second remote user device 210 may be configured to insert a virtual object into the second image 212 based on the further spatial data and virtual object data corresponding to the virtual object. For example, the virtual object may be retrievable from an object library of stored virtual objects as part of the AR platform. The virtual object may be represented in the form of corresponding virtual object data. Thus, the second remote user device 210 may insert, e.g. overlay, the virtual object in the image 212 based on the received spatial data corresponding to the first anchor 130, and based on the virtual object data corresponding to the virtual object. For example, the second remote user device 210 may apply the spatial data to the virtual object data, or vice versa, in order to insert the virtual object at the determined position and/or orientation and/or scale of the first anchor 130, as mapped to the second image 212. FIG. 7B shows an example of the virtual car object 135 overlaid in the second image 212 based on the spatial data mapping the first anchor 130 to the second image 212.

In examples, the second remote user device 210 may be configured to transmit second image capture data 202, comprising the second image 212 as captured by the second remote user device 210, to the first remote user device 110. For example, the second remote user device 210 may be configured to receive further spatial data, associated with the first anchor 130, from the first remote user device 110 in response to sending the second image capture data 202 to the first remote user device 110.

The first remote user device 110 may be configured to receive and process the second image capture data 202 to determine the further spatial data which maps the anchor 130, e.g. assigned to the first remote user device 110, to the second image 212. The first remote user device 110 may be configured to transmit the determined further spatial data to the second remote user device 210.

In other examples, the second remote user device 210 is configured to, additionally or alternatively, receive further spatial data from a third remote user device, e.g. different to the first remote user device 110. The further spatial data may be associated with a further anchor corresponding to a further real-world pose. The further anchor may be assigned to the third remote user device, for example. Similarly to the example described above, the second remote user device 210 may be configured to insert a further virtual object into the second image 212 based on the further spatial data and further virtual object data corresponding to the further virtual object.

Such an AR system 101, as shown in FIG. 1C, may be scaled up to a number N of remote user devices. Each of the N remote user devices may be configured to capture a respective image of a real-world environment and send respective image capture data to the other N−1 remote user devices of the AR system 101, e.g. via the communications network 103.

In examples, each remote user device may capture image data as a series of images, e.g. frame-by-frame. For example, the remote user device may continuously capture images at a given rate. In some examples, each captured image may be transmitted, in the form of image capture data, to one or more other remote user devices. In other examples, each subsequent captured image may be transmitted, in the form of image capture data, to the one or more other remote user devices only if a location of the remote user device has changed by more than a predetermined threshold compared to the location of the remote user device when the preceding image was captured by the remote user device. Otherwise, the image capture data comprising the preceding image sent to the one or more devices may be processed by the one or more other remote user devices in place of the image capture data comprising the subsequent image. Additionally or alternatively, the previously determined spatial data mapping one or more anchors to the preceding image may be used by the remote user device to insert one or more corresponding virtual objects into the subsequent image. This may allow less image data to be transmitted between devices of the AR system 101, thus reducing bandwidth requirements of the AR system 101.

Each of the N remote user devices may be configured to receive respective image capture data comprising the respective images captured by the other N−1 remote user devices. A given remote user device of the N remote user devices may be configured to process the image capture data it receives to determine respective spatial data which maps each anchor assigned to the given remote user device to each of the respective captured images. The given remote user device may be configured to transmit the respective determined spatial data to the respective N−1 other remote user devices. The respective spatial data may be usable by the other N−1 remote user devices to insert one or more virtual objects into their respective captured image, in accordance with the one or more anchors, to generate an augmented reality scene at the respective remote user device, as previously described. For example, different instances of the same virtual object may be inserted by the other N−1 remote user devices into their respective captured images, such that the virtual object is displayed in each of the augmented reality scenes generated at the other N−1 remote user devices.

Thus, each given remote user device of the N remote user devices may, for its own captured image, determine spatial data mapping each anchor assigned to the given remote user device to its own image. The given remote user device may also receive further spatial data, corresponding to each of the anchors assigned to different remote user devices, which maps each of the said anchors, assigned to the different remote user devices, to the image captured by the given remote user device. Thus, the given remote user device may insert a plurality of virtual objects into its captured image, each virtual object corresponding to an anchor mapped to the image, based on the (determined and received) spatial data corresponding to the anchors.

In this way, the processing to determine respective spatial data mapping each of the anchors defined in the AR system to each image captured by corresponding remote user devices of the AR system may be distributed among the remote user devices. For example, each remote user device may be configured to process received image capture data, comprising respective captured images, to determine respective spatial data which maps anchors assigned to the particular remote user device to the respective images, and no other anchor.

Figure 8:
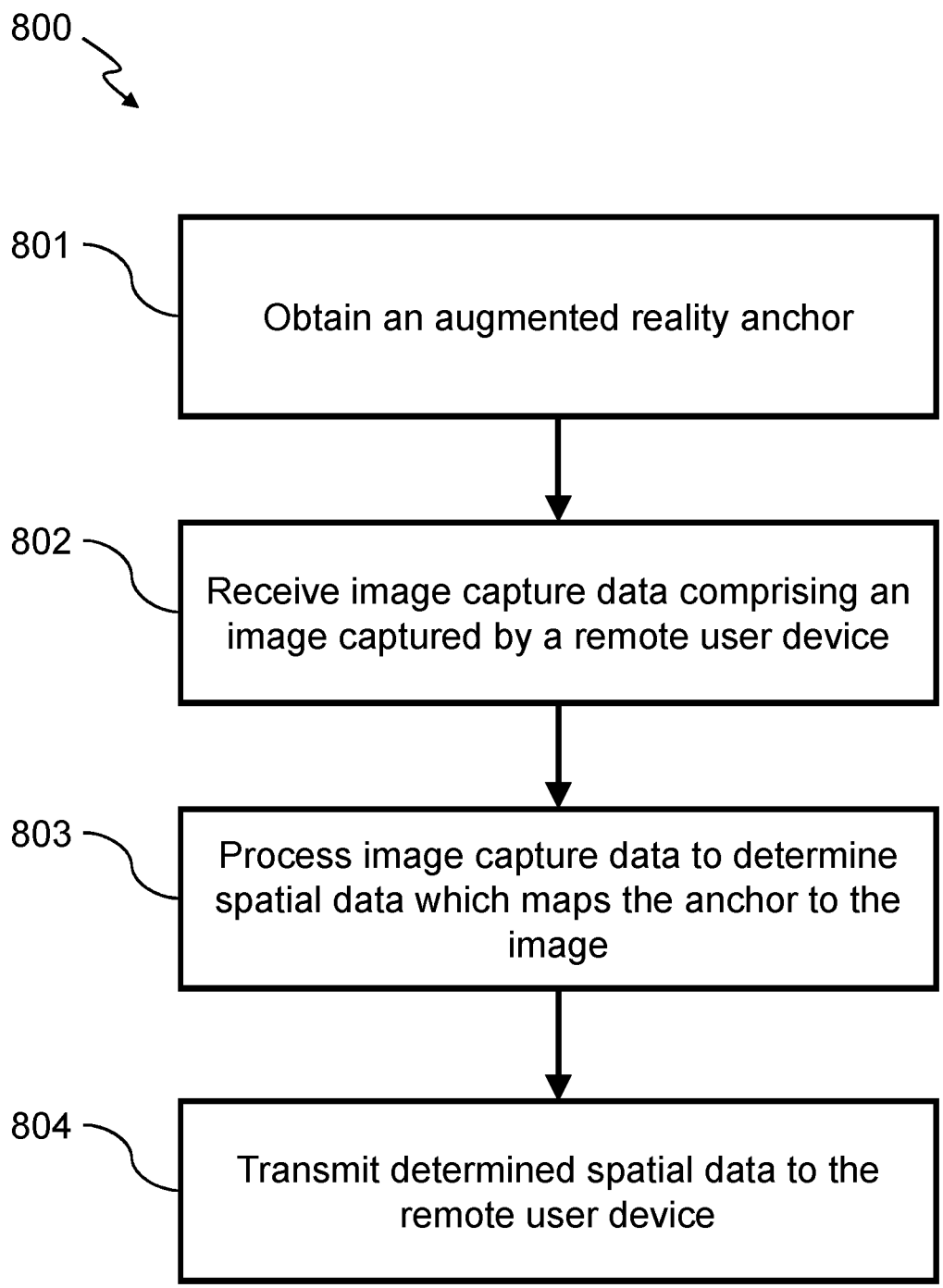
FIG. 8 shows a flow diagram illustrating a computer-implemented method according to an example.

FIG. 8 shows a flow diagram illustrating a computer-implemented method 800, in a computing device, for processing images captured in three-dimensional environments, for the generation of augmented reality scenes. The method 800 may be implemented using any of the computing device examples described herein. The method 800 may be implemented during an AR session shared between a plurality of user devices. An AR session may be started, e.g. on the computing device or one of the plurality of remote user devices, by the user launching an AR application, to enter the AR environment, and may be ended by the user closing the AR application. Alternatively, an AR session may start on the computing device by the user entering an AR environment, after launching an AR application, and may be ended by the user exiting the AR environment, at the same time or prior to the user closing the AR application.

The method 800 involves, at block 801, obtaining an augmented reality anchor. The anchor corresponds to a position and orientation in a real-world environment, as previously described. In some examples, the method 800 may include storing the anchor, e.g. in storage. In examples, the method 800 includes assigning the anchor to the computing device. For example, assigning the anchor to the computing device may include generating assignment data, the assignment data corresponding to any of the previously described examples.

The method 800 further includes, at block 802, receiving image capture data via data communication from a remote user device. The image capture data comprises an image captured by the remote user device. The image represents the real-world environment as viewed by the remote user device. The real-world environment contains the real-world position of the anchor.

The method 800 further includes, at block 803, processing the image capture data to determine spatial data which maps the anchor to the image. The spatial data is usable by the remote user device to insert a virtual object into the image, in accordance with the anchor, to generate an augmented reality scene at the remote user device. In examples, the processing the image capture data, to determine the spatial data, comprises performing a pose estimation based on the image and the anchor.

The method 800 further includes, at block 804, transmitting the determined spatial data, via data communication, to the remote user device.

In some examples, the method 800 includes generating the anchor at the computing device. For example, the anchor may be generated at the computing device, e.g. by a user. In other examples, the anchor may be generated at another component of the AR system and, for example, assigned to the computing device. In some examples, the method 800 includes, in response to generating the anchor at the computing device, transmitting a data message to the remote device, the data message reporting the existence of the anchor. In certain cases, the method 800 includes, in response to generating the anchor at the computing device, assigning the anchor to the computing device.

In examples, the anchor is one of a plurality of AR anchors. For example, the method 800 may include obtaining the plurality of anchors. Each anchor may be assigned to the computing device. Each anchor may correspond to a respective position and orientation in the real-world environment, e.g. a respective real-world pose.

The method 800 may include processing the image capture data to determine respective spatial data which maps each of the plurality of anchors to the image. The respective spatial data may be usable by the remote user device to insert respective virtual objects into the image, in accordance with the anchors, to generate the augmented reality scene at the remote user device, as previously described. The method 800 may include transmitting the determined respective spatial data, via data communication, to the remote user device.

In examples, the receiving at block 802 includes receiving respective image capture data from a plurality of remote user devices, including the remote user device. The respective image capture data may comprise respective images captured by the plurality of remote user devices. Each of the respective images may represent the real-world environment, as viewed by the respective remote user device.

The method 800 may further involve, at block 803, processing the respective image capture data to determine respective spatial data which maps the anchor to each respective image.

As previously described, the determined respective spatial data may be usable by the respective remote user device to insert a virtual object into the respective image, in accordance with the anchor, to generate an augmented reality scene at the respective remote user device. The transmitting, at block 804, may include transmitting the determined respective spatial data to the respective remote user devices.

In examples, the computing device is a second remote user device of the plurality of remote user devices, as described in previous examples. The method 800 may thus involve obtaining further image capture data comprising a further image captured by the second remote user device. For example, the further image capture data may be obtained from an image sensor on the second remote user device, the image sensor used to capture the further image.

In examples, the method 800 further includes receiving further spatial data associated with, e.g. determined based on, a further anchor. Virtual object data associated with a virtual object may be obtained, such that the virtual object may be inserted into the further image captured by the second remote user device based on the received further spatial data and the obtained virtual object data.

In some examples, the method 800 includes determining a real-world location of the second remote user device at a time the further image was captured by the second remote user device. For example, the further image may be "time stamped" and/or "location stamped" with associated metadata storing the real-world location of the second remote user device and/or the time at which further image was captured. The method 800 may further involve, in response to determining that the real-world location differs from a previous real-world location of the second remote user device by more than a predetermined threshold, transmitting the further image capture data, comprising further image captured by the second remote user device, to another remote user device for processing thereat. For example, a series of images may be captured by the second remote user device frame-by-frame. In some examples, each captured image may be transmitted, as image capture data, to one or more other remote user devices. In other examples, each subsequent captured image may be transmitted as image capture data to the one or more other remote user devices only if a location of the second remote user device has changed by more than a predetermined threshold compared to the location of the second remote user device when the preceding image was captured. Otherwise, the image capture data comprising the preceding image may be processed by the one or more other remote user devices in place of the image capture data comprising the subsequent image. This may allow less image capture data to be transmitted between devices, e.g. during the AR session, thus reducing bandwidth requirements of the AR system.

Figure 9:
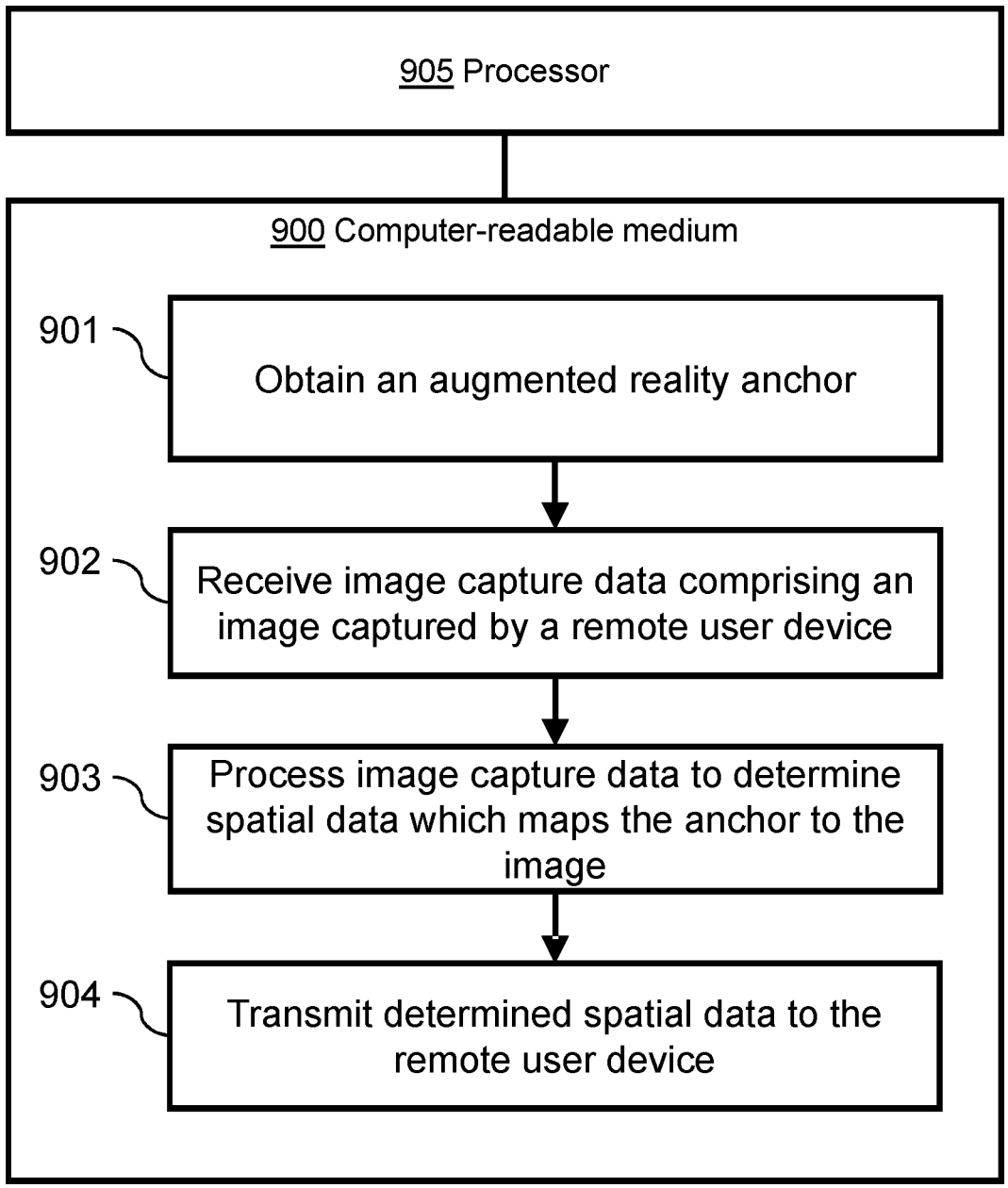
FIG. 9 shows a schematic representation of a computer-readable storage medium comprising a set of computer-readable instructions and connected to a processor, according to an example.

FIG. 9 shows an example of a non-transitory computer-readable storage medium 900 comprising a set of computer readable instructions which, when executed by at least one processor 905, cause the at least one processor to perform a method according to examples described herein.

At block 901, the instructions cause the processor 905 to obtain an augmented reality anchor. The anchor corresponds to a position and orientation in a real-world environment.

In examples, the instructions at block 901 may cause the processor 905 to store the anchor in storage. The storage may be volatile, such as a static random-access memory (SRAM), a dynamic random-access memory (DRAM), and/or cache storage. In other examples, the storage may be non-volatile, such as a read-only memory (ROM), a programmable read-only memory (PROM), or an erasable programmable read-only memory (EPROM). For example, the instructions at block 901 may cause the processor 905 to store data representing the anchor in storage. The anchor may thus be obtained by the processor 905 accessing the storage which stores the data representing the anchor.

At block 902, the instructions cause the processor 905 to receive image capture data via data communication from a remote user device. The image capture data comprises an image captured by the remote user device, the image representing the real-world environment as viewed by the remote user device.

At block 903, the instructions cause the processor 905 to process the image capture data to determine spatial data which maps the anchor to the image. The spatial data is usable by the remote user device to insert a virtual object into the image, in accordance with the anchor, to generate an augmented reality scene at the remote user device.

At block 904, the instructions cause the processor 905 to transmit the determined spatial data via data communication to the remote user device.

The computer readable instructions may be retrieved from machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In any of the examples described above, the sending and processing of image capture data comprising captured images, and the receipt of determined spatial data (from the one or more devices having assigned anchors) which maps the one or more anchors to the captured images, may all be enacted within 16 milliseconds. In such a time period, each subsequent frame captured by a given remote user device can be processed in the AR system, updated with the inserted virtual objects, in accordance with the mapped anchor poses, and displayed as an augmented reality scene at the given remote user device at a rate of 60 frames per second (fps).

In examples, the bandwidth requirements of the AR system may be reduced by certain means. For example, the versions of the captured images that are sent in the form of image capture data between devices of the AR system, e.g. via a network, may be encoded in a different colour space to that of the image versions to be displayed as augmented reality scenes at the remote user devices. For example, the remote user devices may encode their captured images in 32-bit RGBA8888 for displaying the augmented reality scene at the remote user device, whereas the captured images may be encoded in 16-bit RGB565 when sent as image capture data between devices of the AR system for processing.

Similarly, as another example means for reducing the bandwidth requirements of the AR system, the versions of the captured images that are sent as image capture data between devices of the AR system may be at a lower image resolution relative to the image versions to be displayed as augmented reality scenes at the remote user devices. For example, the remote user devices may display their generated augmented reality scenes at a resolution of 1080p, whereas the captured images may have a resolution of 540p or 720p when sent as image capture data between devices of the AR system for processing.

Thus, when processing image capture data, comprising a captured image, to determine spatial data which maps an anchor to the captured image, the computing device may process a version of the image that is altered compared to the version of the image that is to be displayed as an AR scene. For example, the version of the image may have a relatively lower resolution and/or may be encoded in a different colour space.

According to examples described above, the computing device comprises a processor or processing system. In examples, the processing system comprises one or more processors and/or memory. In examples, the processing system comprises one or more GPUs. Each device as described in relation to any of the embodiments described above may similarly comprise a processor and/or processing system. One or more of the aspects of the examples described herein with reference to the drawings comprise processes performed by an augmented reality remote user device 110, 210. In embodiments, the augmented reality remote user device 110, 210 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Examples also extend to computer programs, particularly computer programs on or in a carrier, adapted for putting the above described embodiments into practice. The program may be in the form of non-transitory source code, object code, or in any other non-transitory form suitable for use in the implementation of processes according to examples. The carrier may be any entity or device capable of carrying the program, such as a RAM, a ROM, or an optical memory device, etc.

Some examples are described above in relation to an augmented reality (AR) environment. Such AR environment examples can also be applied in a virtual reality (VR) environment and vice versa, or a combination of AR and VR environments.

The above examples are to be understood as illustrative. Further examples are envisaged. For example, the AR system may include a server device and multiple remote user devices, as described. In some examples, the server device may be assigned all anchors present in the AR system, e.g. created during an AR session. In other examples, assignment of the anchors may be distributed between the server device and one or more remote user devices. For example, the server device may be assigned all but a number M of anchors. The M anchors not assigned to the server device may be assigned to one or more remote user devices. As described, each device processes received images, captured by other remote user devices, to determine spatial data which maps the one or more anchors assigned to that device to each image. Thus, devices that are not assigned an anchor may not process received images. In some examples, such unassigned devices may not receive images captured by other remote user devices. For example, remote user devices may only transmit their captured image to the one or more devices that have at least one anchor assigned thereto.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure.

What is claimed is:

1. A computing device for processing images captured in three-dimensional environments for the generation of augmented reality scenes, the computing device being configured to:

obtain, by the computing device, an augmented reality anchor, the anchor corresponding to a trackable object or feature having a position and orientation in a real-world environment, wherein the anchor is associated with an identifier of the computing device, and wherein the anchor and the associated identifier are stored in a data structure of the computing device;

receive, by the computing device, image capture data via data communication from a remote user device, wherein said image capture data is transmitted from said remote user device to said computing device only if a location of the remote user device has changed by more than a predetermined threshold compared to the location of the remote user device when the preceding image was captured by the remote user device, the image capture data comprising an image captured by the remote user device, the image representing a real-world scene as viewed by the remote user device;

process, by the computing device, the image capture data comprising an image representing a real-world scene, to identify the trackable object or feature and to determine spatial data which maps the corresponding anchor to the image, the spatial data being usable by the computing device to track the anchor and by the remote user device to insert a virtual object into the image in accordance with the anchor to generate an augmented reality scene at the remote user device; and transmit, by the computing device, the determined spatial data via data communication to the remote user device to insert a virtual object into the image.

2. A computing device according to claim 1, wherein the determined spatial data comprises at least one of position, orientation and scale data corresponding to the anchor arranged in the image.

3. A computing device according to claim 1, wherein the computing device is configured to process the image to determine the spatial data using pose estimation.

4. A computing device according to claim 1, wherein the anchor is a first anchor, the computing device being configured to:

obtain, by the computing device, a plurality of augmented reality anchors, including the first anchor, each of the plurality of anchors corresponding to a trackable object or feature having a respective position and orientation in the real-world environment;

process, by the computing device, the image capture data to identify each trackable object or feature and determine respective spatial data which maps each of the corresponding plurality of anchors to the image, the respective spatial data being usable by the computing device to track each of the plurality of anchors and by the remote user device to insert respective virtual objects into the image in accordance with the anchors to generate the augmented reality scene at the remote user device; and transmit, by the computing device, the determined respective spatial data via data communication to the remote user device.

5. A computing device according to claim 1, wherein the computing device is configured to:

receive, by the computing device, respective image capture data via data communication from a plurality of remote user devices including the remote user device, the respective image capture data comprising respective images captured by the plurality of remote user devices, each of the respective images representing respective real-world scenes as viewed by the respective remote user device;

process, by the computing device, the respective image capture data to identify the trackable object or feature and determine respective spatial data which maps the corresponding anchor to the respective image, the respective spatial data being usable by the computing device to track the anchor and by the respective remote user device to insert a virtual object into the respective image, in accordance with the anchor, to generate an augmented reality scene at the respective remote user device; and transmit, by the computing device, the respective determined spatial data to the respective remote user devices.

6. A computing device according to claim 1, wherein the computing device comprises a server device communicatively coupled to a plurality of remote user devices including the remote user device.

7. A computing device according to claim 1, wherein the remote user device is a first remote user device, the computing device comprising a second remote user device.

8. A computing device according to claim 7, wherein the image capture data comprises first image capture data, comprising a first image captured by the first remote user device, the second remote user device being configured to obtain second image capture data comprising a second image captured by the second remote user device.

9. A computing device according to claim 8, wherein the second remote user device is configured to:

receive further spatial data from a third remote user device, the further spatial data associated with a further anchor corresponding to further trackable object or feature having a further position and orientation in the real-world environment; and insert a virtual object into the second image based on the further spatial data and virtual object data corresponding to the virtual object.

10. A computer-implemented method in a computing device for processing images captured in three-dimensional environments, for the generation of augmented reality scenes, the method comprising:

obtaining, by the computing device, an augmented reality anchor, the anchor corresponding to a trackable object or feature having a position and orientation in a real-world environment, wherein the anchor is associated with an identifier of the computing device, and wherein the anchor and the associated identifier are stored in a data structure of the computing device;

receiving, by the computing device, image capture data via data communication from a remote user device, wherein said image capture data is transmitted from said remote user device to said computing device only if a location of the remote user device has changed by more than a predetermined threshold compared to the location of the remote user device when the preceding image was captured by the remote user device, the image capture data comprising an image captured by the remote user device, the image representing a real-world scene as viewed by the remote user device;

processing, by the computing device, the image capture data comprising an image representing a real-word scene, to identify the trackable object or feature and to determine spatial data which maps the corresponding anchor to the image, the spatial data being usable by the computing device to track the anchor and by the remote user device to insert a virtual object into the image in accordance with the anchor to generate an augmented reality scene at the remote user device; and transmitting, by the computing device, the determined spatial data via data communication to the remote user device to insert a virtual object into the image.

11. A computer-implemented method according to claim 10, wherein the processing the image capture data comprises performing a pose estimation based on the image capture data and the anchor.

12. A computer-implemented method according to claim 10, the method comprising:
  generating the anchor at the computing device; and
  in response to generating the anchor at the computing device, transmitting a data message to the remote device, the data message reporting the existence of the anchor.

13. A computer-implemented method according to claim 10, wherein the anchor is a first anchor, and wherein:
  the obtaining, by the computing device, comprises obtaining a plurality of augmented reality anchors, including the first anchor, each of the plurality of anchors corresponding to a trackable object or feature having a respective position and orientation in the real-world environment;
  the processing, by the computing device, comprises processing the image capture data to identify each trackable object or feature and determine respective spatial data which maps each of the corresponding plurality of anchors to the image, the respective spatial data being usable by the computing device to track each of the plurality of anchors and by the remote user device to insert respective virtual objects into the image in accordance with the anchors to generate the augmented reality scene at the remote user device; and
  the transmitting, by the computing device, comprises transmitting the determined respective spatial data via data communication to the remote user device.

14. A computer-implemented method according to claim 10, wherein:
  the receiving, by the computing device, comprises receiving respective image capture data via data communication from a plurality of remote user devices, including the remote user device, the respective image capture data comprising respective images captured by the plurality of remote user devices, each of the respective images representing respective real-world scenes, as viewed by the respective remote user device;
  the processing, by the computing device, comprises processing the respective image capture data to identify the trackable object or feature and determine respective spatial data which maps the anchor to each respective image, the respective spatial data being usable by the computing device to tack the anchor and by the respective remote user device to insert a virtual object into the respective image, in accordance with the anchor, to generate an augmented reality scene at the respective remote user device; and
  the transmitting, by the computing device, comprises transmitting the determined respective spatial data to the respective remote user devices.

15. A computer-implemented method according to claim 10, wherein the remote user device comprises a first remote user device, the computing device comprising a second remote user device,
  wherein the method comprises obtaining further image capture data comprising a further image captured by the second remote user device.

16. A computer-implemented method according to claim 15, the method comprising:
  receiving further spatial data associated with a further anchor corresponding to a further trackable object or feature, the further spatial data being useable by the second remote user device to insert a virtual object into the further image, in accordance with the further anchor, to generate an augmented reality scene at the second remote user device;
  obtaining virtual object data associated with a virtual object for inserting into an image; and
  inserting the virtual object into the further image based on the received further spatial data and the obtained virtual object data.

17. A computer-implemented method according to claim 15, the method comprising:
  determining a real-world location of the second remote user device at a time the further image was captured by the second user device; and
  in response to determining that the real-world location differs from a previous real-world location of the second remote user device by more than a predetermined threshold,
  transmitting the further image capture data, comprising the further image captured by the second remote user device, to another remote user device for processing thereat.

18. A non-transitory computer-readable storage medium comprising a set of computer-readable instructions stored thereon which, when executed by at least one processor, cause the at least one processor to:
  obtain, by the at least one processor, an augmented reality anchor, the anchor corresponding to a trackable object or feature having a position and orientation in a real-world environment, wherein the anchor is associated with an identifier of a computing device, and wherein the anchor and the associated identifier are stored in a data structure of the computing device;
  receive, by the at least one processor, image capture data via data communication from a remote user device, wherein said image capture data is transmitted from said remote user device only if a location of the remote user device has changed by more than a predetermined threshold compared to the location of the remote user device when the preceding image was captured by the remote user device, the image capture data comprising an image captured by the remote user device, the image representing a real-world scene as viewed by the remote user device;
  process, by the at least one processor, the image capture data comprising an image representing a real-world scene, to identify the trackable object or feature and to determine spatial data which maps the corresponding anchor to the image, the spatial data being usable by the computing device to track the anchor and by the remote user device to insert a virtual object into the image in accordance with the anchor to generate an augmented reality scene at the remote user device; and
  transmit, by the at least one processor, the determined spatial data via data communication to the remote user device to insert a virtual object into the image.

\* \* \* \* \*